Patented Aug. 8, 1933

1,921,124

UNITED STATES PATENT OFFICE 1,921,124

ICE CREAM AND PROCESS OF PREPARING SAME

Willy O. Herrmann and Wolfram Haehnel, Munich, Germany, assignors to Consortium fur Elektrochemische Industrie, Munich, Germany, a Corporation No Drawing. Application August 23, 1932, Serial No. 630,060, and in Germany July 23, 1931

10 Claims. (Cl. 99—11)

This invention relates to ice cream and a process of preparing same.

An object of the invention is to provide a homogeneous ice cream of creamy consistency and good texture.

Another object is to provide an ice cream free of ice crystals.

A good ice cream should be homogeneous, creamy, and free of ice crystals, as for example an ice cream containing a large amount of butter fat. Ice cream prepared from milk is not creamy or homogeneous and has an objectionable amount of ice crystals, due to the large amount of water in the milk. If milk or butter fat is not used, the product possesses no creaminess and the large amount of ice crystals present is very objectionable.

It has been attempted to overcome these disadvantages in many different ways, but without success. Churning the ice cream mix, or treating it in a homogenizer before freezing, with or without gelatin or pectin, does not accomplish the desired results. Furthermore, gelatin is easily decomposed by bacteria and gives a disagreeable taste, and pectin affects the flavor of the cream and gives it a sticky consistency.

We have now found that upon freezing an ice cream mix containing polymerized vinyl alcohol, a homogeneous ice cream of good creaminess and appearance and free of ice crystals is obtained. The process is simplified, less stirring and freezing is required and no formation of hard incrustations of ice, etc., occurs at the walls of the freezing apparatus. Various modifications of polymerized vinyl alcohol may be used, but the highly polymerized modifications are generally most effective.

This invention is very effective in the manufacture of fruit ice cream, such as citrus ice cream, raspberry ice cream, etc. The appearance and flavor of the product is improved, and a creaminess and homogeneity are realized which are ordinarily possible only by means of large additions of milk, cream or eggs. Such valuable refreshments do not have a large calorific value, and do not cause dyspepsia.

An ice cream of improved quality may be obtained by adding polymerized vinyl alcohol to an ice cream mix containing milk, cream or eggs, and a small addition of such alcohol will replace large quantities of milk, cream or eggs heretofore used in making ice cream of the best quality. This invention is especially useful where the minimum content of butter fat prescribed by law is to be used, as the product obtained has the same qualities heretofore obtained only by means of larger amounts of butter fat. The time required for freezing the mix and the degree of freezing is greatly diminished.

Polymerized vinyl alcohol is a synthetic product and always has the same properties and qualities, and an ice cream containing the same always has a uniform quality. Gelatin, pectin and the like are natural products and have varying properties and qualities, depending upon the plant or animal source, and do not give a uniform product. A solution of polymerized vinyl alcohol, unlike pectin and gelatin, is not affected by bacteria, boiling, acid or alkaline conditions, and does not coagulate cream or milk, even upon boiling.

The manufacture of ice cream containing spirituous liquors is ordinarily very difficult, as such liquors tend to separate ice crystals, but with the addition of polymerized vinyl alcohol the process is very simple, a homogeneous freezing is obtained and the tendency to disintegrate from ice crystals is overcome. Other body-giving products are unsuitable in the manufacture of ice creams containing spirituous liquors. Gelatin, for example, gives the cream a bad flavor and a noxious secondary effect, and cannot be used in quantities greater than 0.3%. Polymerized vinyl alcohol does not possess such undesirable properties and can be used in any amount.

In making coffee ice cream, the necessary creaminess and absence of ice crystals have heretofore been obtained only by addition of large amounts of cream or milk, and the flavor of the milk detracted from the flavor of the ice cream. With polymerized vinyl alcohol, less cream or milk is required, and the flavor of the ice cream is unaffected. Similarly, vanilla ice cream, chocolate ice cream, etc., without or with small quantities of cream or milk can be obtained.

Polymerized vinyl alcohol may be used in the manufacture of completely frozen ice cream, partially frozen ice cream and iced drinks such as iced coffee, iced tea, iced chocolate, etc.

*Example I*

10 grams of polymerized vinyl alcohol of a medium degree of polymerization were dissolved in a mixture of 400 grams of raspberry syrup and 600 grams of water. The mix was frozen in a stirring apparatus by means of a freezing mixture. A raspberry water ice was obtained of good cream-like flavor and appearance, and free of ice crystals, and was similar to a product obtained from a mix containing cream.

Without the addition of polymerized vinyl alcohol the product was not homogenous or creamy, had a bad appearance, and contained large ice crystals.

The product obtained by substituting 10 grams of gelatin for 10 grams of polymerized vinyl alcohol was also not homogeneous or creamy, had a bad appearance, contained large ice crystals, and required a longer freezing time.

*Example II*

10 grams of highly polymerized vinyl alcohol were heated with 1000 grams of milk and two sticks of vanilla for one hour at about 90° C. 180 grams of sugar and 5 egg yolks were added, the mass filtered, and after cooling was subjected to a freezing mixture with vigorous stirring. After an hour, a homogeneous vanilla ice cream of good appearance, color, flavor, and creamy consistency was obtained.

Substituting 10 grams of pectin for the polymerized vinyl alcohol, the milk was partly coagulated at 90° C. and upon filtration a considerable residue was obtained. Egg yolks and sugar were added to the filtrate, and it required 1½ hours to freeze the same. The product was coarsely crystalline, was not homogeneous and did not have the flavor of the polymerized vinyl alcohol product.

*Example III*

1000 grams of milk were heated to 90° C., and 10 grams of highly polymerized vinyl alcohol, two sticks of vanilla, 180 grams of sugar and 5 egg yolks were added, the mass was filtered and after cooling was subjected to a freezing mixture with vigorous stirring for one hour. The ice cream had the same qualities as the product of Example II.

Substituting 10 grams of pectin, it required 1½ hours of freezing and the product was coarsely crystalline, had an inferior flavor and was not homogeneous. Similar results were obtained by substituting 10 grams of gelatin for 10 grams of pectin.

*Example IV*

800 grams of water, 144 grams of sugar, 8 grams of highly polymerized vinyl alcohol, 4 egg yolks, 1 stick of vanilla and 57 grams of a brandy (Stonsdorfer Magenbitter) were frozen in a stirring apparatus. A homogeneous ice cream of good appearance and flavor was obtained, and no ice or other incrustations were formed on the walls of the freezing apparatus.

Substituting 8 grams of gelatin for the polymerized vinyl alcohol gave a non-homogeneous ice cream of coarse structure, inferior flavor and unpleasant stickiness, and formed ice incrustations on the walls of the apparatus. With only 3 grams of gelatin the product was less homogeneous and a larger amount of ice incrustations was formed.

*Example V*

1000 grams of vanilla ice cream containing polymerized vinyl alcohol prepared according to Example II were mixed with 200 grams of currants, 200 grams of raspberries and 200 grams of grapefruit. A refreshing dish of good flavor and appearance was obtained.

While we have described the preferred embodiment of our invention, it is to be understood that the invention is not to be limited to all of the details hereinbefore described, but we claim broadly adding a polymerized vinyl alcohol to an ice cream mix, and subjecting the mass to a freezing temperature, and the product obtained thereby.

We claim as our invention:

1. The process comprising adding polymerized vinyl alcohol to an ice cream mix, and subjecting the mass to a freezing temperature.

2. The process comprising adding highly polymerized vinyl alcohol to an ice cream mix, and subjecting the mass to a freezing temperature.

3. The process comprising adding up to about 1% of highly polymerized vinyl alcohol to an ice cream mix containing butter fat, and subjecting the mass to a freezing temperature.

4. The process comprising adding up to about 1% of highly polymerized vinyl alcohol to an ice cream mix containing a fruit juice, and subjecting the mass to a freezing temperature.

5. The process comprising adding up to about 1% of highly polymerized vinyl alcohol to an ice cream mix containing a spirituous liquor, and subjecting the mass to a freezing temperature.

6. Ice cream containing polymerized vinyl alcohol.

7. Ice cream containing highly polymerized vinyl alcohol.

8. Ice cream containing butter fat and up to about 1% of highly polymerized vinyl alcohol.

9. Ice cream containing a fruit juice and up to about 1% of highly polymerized vinyl alcohol.

10. Ice cream containing a spirituous liquor and up to about 1% of highly polymerized vinyl alcohol.

WILLY O. HERRMANN.
WOLFRAM HAEHNEL.